July 30, 1963  K. H. BURZLAFF  3,099,440
APPARATUS FOR CONTROLLING THE FLOW OF FLUIDS
Filed Sept. 26, 1960  2 Sheets-Sheet 1

INVENTOR.
KARL H. BURZLAFF
BY
ATTORNEYS

July 30, 1963     K. H. BURZLAFF     3,099,440
APPARATUS FOR CONTROLLING THE FLOW OF FLUIDS
Filed Sept. 26, 1960     2 Sheets-Sheet 2
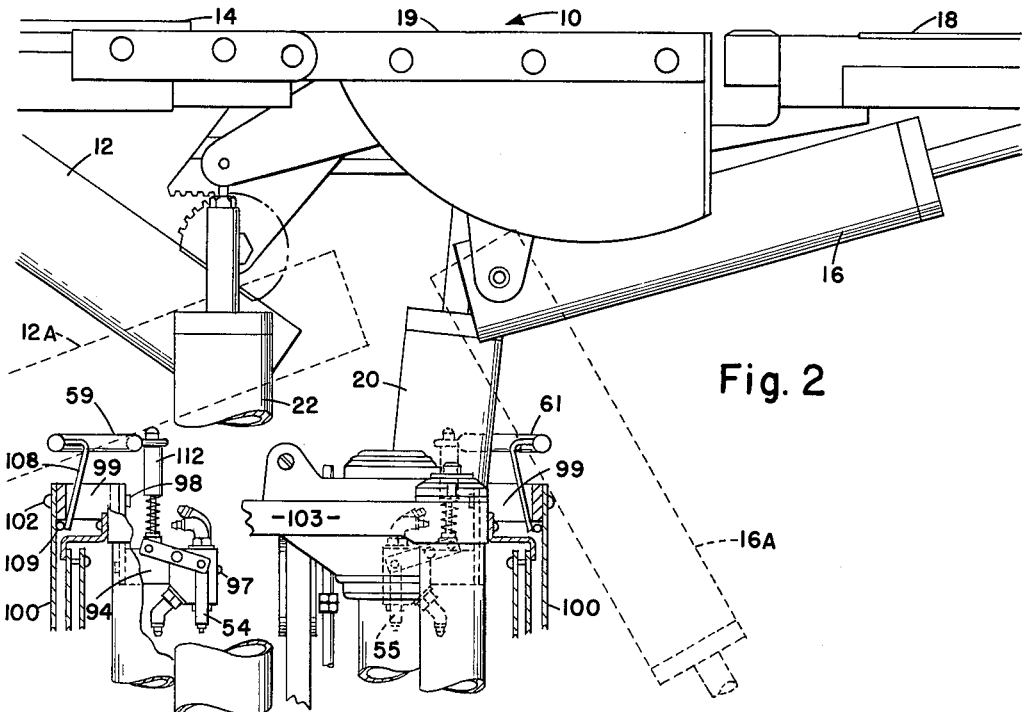
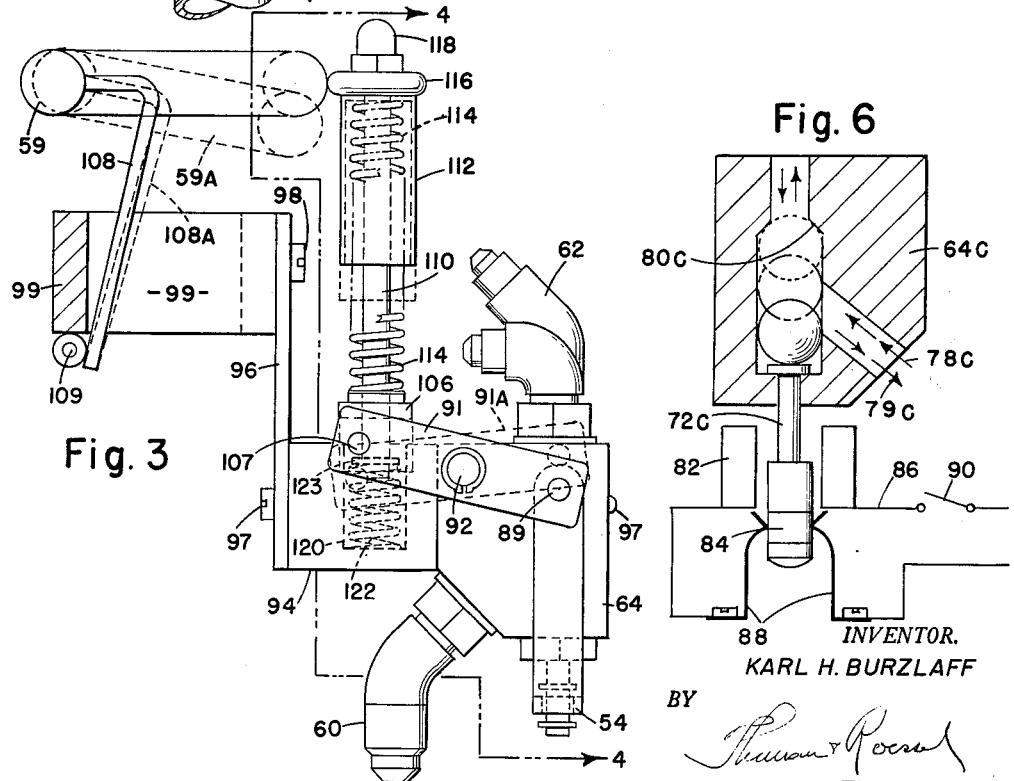
INVENTOR.
KARL H. BURZLAFF
BY
*Thuman & Koerul*
ATTORNEYS United States Patent Office 3,099,440
Patented July 30, 1963

3,099,440
APPARATUS FOR CONTROLLING THE FLOW OF FLUIDS
Karl H. Burzlaff, Fairport, N.Y., assignor to Ritter Company, Inc., Rochester, N.Y., a corporation of Delaware
Filed Sept. 26, 1960, Ser. No. 58,242
5 Claims. (Cl. 269—325)

This invention relates to apparatus for controlling the flow of fluids and more particularly to apparatus for sensing the movement of fluid controlled apparatus or devices for controlling or limiting the movement of selected parts of such apparatus.

I have illustrated and described one embodiment of my invention as controlling certain parts of a surgical table for which use my invention has a particularly significant application. My invention prevents self-destruction of the surgical table. However, it will be understood that the nature of my invention is considerably broader than the restricted application shown in the drawings and described hereinafter.

The details of one such surgical table with which my invention is particularly adapted for use is described more in detail in my copending application entitled Surgical Table Serial No. 57,807, filed on September 22, 1960 in the United States Patent Office, which issued June 26, 1962 as Patent No. 3,041,120.

One of the objects of this invention is to provide improved apparatus for sensing and controlling movement of fluid controlled apparatus.

A further object of my invention is the provision of an improved safety device for limiting the motion of fluid controlled apparatus.

Another object of my invention is the provision of a safety device for preventing a movable portion of fluid controlled apparatus from damaging a stationary portion of said apparatus.

One important object of my invention is the provision of apparatus effective to control the flow of fluid in a fluid system when flowing in one direction and ineffective to control the flow of the fluid in the opposite direction.

A further object of my invention is to provide a sensing device reactionable to the movement of a fluid controlled apparatus, such as a surgical table top, and a valve arrangement responsive to the sensing device for controlling the flow of fluid in a fluid system effective to control such apparatus.

Still another important object of my invention is the provision of safety apparatus for stopping and locking fluid controlled movable apparatus in one or more selected positions.

Other objects and advantages of this invention will be particularly set forth in the claims and will be apparent from the following description, when taken in connection with the accompanying drawings, in which:

FIG. 2 is a partial side elevation of a surgical table partly in section, including illustrated multiple positions of parts in broken lines;

FIG. 3 is an enlarged side elevation of part of the apparatus shown in FIG. 2 constituting part of my invention;

FIG. 6 is a sectional view of a second embodiment of the valve shown in FIG. 5, with parts removed.

Figure 1:
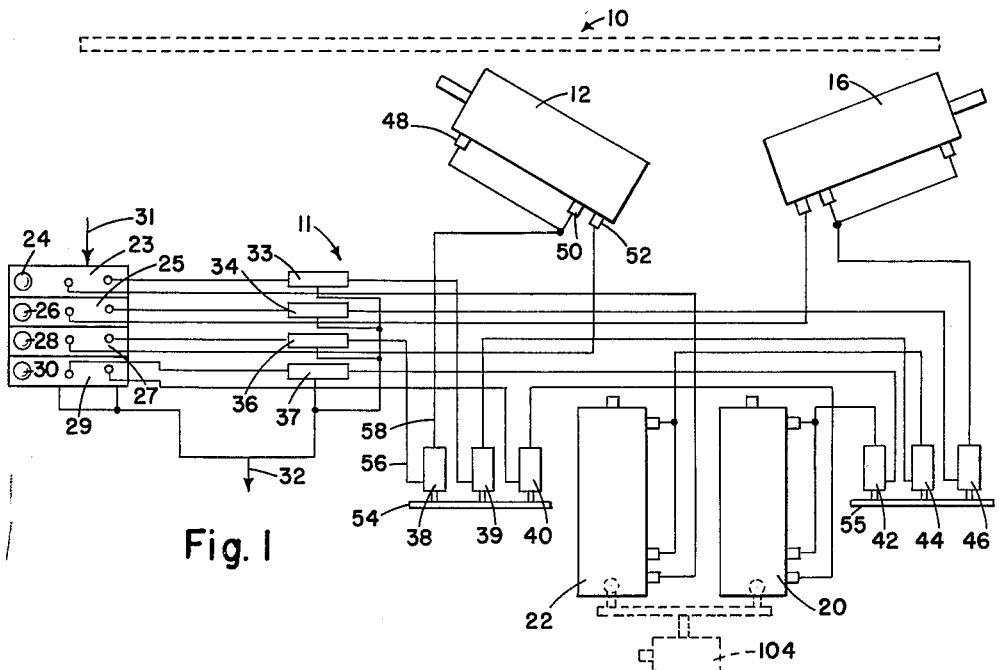
FIG. 1 is a diagrammatic view of the hydraulic or fluid system used for controlling the surgical table.

Referring to FIG. 1, the illustrated surgical table with which this invention is adapted for use includes a sectional table top, generally indicated by the numeral 10, and the hydraulic or fluid system generally indicated by the numeral 11. I have illustrated only part of the closed hydraulic or fluid system 11 of the major surgery table described in my copending application entitled Surgical Table filed on or about September 22, 1960, in the United States Patent Office.

The illustrated embodiment of my invention includes four of the five hydraulic control piston and cylinder assemblies shown in my above mentioned copending application including, a spinal cylinder 12 for controlling a spinal section 14 (see FIG. 2); a femoral cylinder 16 for the control of the femoral section 18 (see FIG. 2); a Trendelenburg cylinder 20 for movement of the table top 10 to Trendelenburg and reverse Trendelenburg positions, i.e., pivoting the table 10 about a horizontal axis; and a lateral tilt cylinder 22 for tilting the table top 10 about a longitudinal axis. The femoral section 18 and the spinal section 14 are articulated with respect to the pelvic section 19 intermediate these sections of the surgical table top 10.

The fluid flowing to these four control cylinders 22, 16, 12 and 20 is respectively controlled by four control valves 23, 25, 27 and 29. The four control valves are respectively operated by four handles or hand controls 24, 26, 28 and 30.

When the handle corresponding to each of these valves is pulled rearward, oil under pressure is applied respectively to the top of the lateral tilt cylinder 22, the bottom of the femoral cylinder 16, the bottom of the spinal cylinder 12 and the top of the Trendelenburg cylinder 20. Reverse movement of the handles reverses the direction of the flow of the fluid in the fluid or hydraulic system. Since hydraulic valves in systems of this type are old and well known they need not be more particularly described.

Because of the clarity of this diagrammatic view, it is believed not to be necessary to specifically trace the fluid or hydraulic lines.

Fluid is supplied to the four control valves from a pump (not shown) as diagrammatically indicated by the arrow 31. The fluid returning to a sump (not shown) from the four control valves is indicated by an exhaust line 32. Relief valves diagrammatically shown at 33, 34, 36 and 37 are respectively incorporated within the control valves 23, 25, 27 and 29 and open when the piston in the corresponding cylinders retract.

The hydraulic or fluid system is provided with six movement limit cutoff valves 38, 39, 40, 42, 44 and 46 effective to control the limits to which the table top 10 may be pivoted or otherwise moved by the control cylinders 12, 16, 20 and 22 as more particularly described hereinafter with reference to FIG. 4.

Each of the control cylinders is provided with two inlets 48 and 50 and one outlet 52 (FIG. 1). It will be understood that when fluid is supplied through the outlet 52 to the lower end of the control cylinder, the piston inside the cylinder is elevated. Inlets 48 and 50 are connected to the same fluid pressure line. When fluid is supplied to the inlet 50, a one-way valve (not shown), which is located in the lower end of the control cylinder, is normally open when the piston is being elevated; this one-way valve (not shown) is forced open by the pressure supplied at 50. This permits the discharge or exhaust flow of fluid from the lower end of the control valve out through outlet 52 responsive to the pressure on top of the piston entering at 48. The details of this valving arrangement are set forth in my copending application entitled Surgical Table Serial No. 57,807 filed in the United States Patent Office on September 22, 1960, which issued June 26, 1962 as Patent No. 3,041,120.

The illustrated embodiment as shown in FIG. 1 provides a left bank of three cutoff valves 38, 39 and 40 and a right bank of cutoff valves 42, 44 and 46. Both the left and right banks of cutoff valves are respectively provided with plunger actuating levers 54 and 55 common to the three valves of each bank. The fluid flowing from a valve inlet 56 to a valve outlet 58 is stopped when levers 54 and 55 are actuated upwardly thereby to stop and lock the table top 10 against any further movement in the manner and for the purposes set forth hereinafter.

It will be understood from the detailed description hereinafter with reference to FIG. 4 that whichever bank of cutoff valves has fluid passing from the outlet side 58 to the inlet 56 will be ineffective to control movement of the table top 10.

The left bank of cutoff valves 38, 39 and 40 are, respectively, effective to stop retraction of the pistons in spinal cylinder 12 and lateral tilt cylinder 22, and elevation of the piston in Trendelenburg cylinder 20. When any part of the surgical table is brought into an interfering or engaging position with a sensing lever 59 (see FIG. 2) which controls lever 54 of the left bank of valves, valves 38, 39 and 40 close; cylinders 12, 22 and 20 are stopped and locked against further movement by these cutoff valves, thereby to stop and lock the table top 10 against any further motion.

The right bank of cutoff valves 42, 44 and 46 are, respectively, effective when actuated by lever 55 to stop retraction of the pistons in Trendelenburg cylinder 20, lateral tilt cylinder 22 and femoral cylinder 16. When any part of the surgical table is brought into an interfering position with a sensing lever 61 (FIG. 2) which controls lever 55 of the right bank of valves, valves 42, 44 and 46 close; cylinders 20, 22 and 16 are stopped and locked against further movement by these cutoff valves, thereby stopping and locking the table top 10 against any further motion.

It will be noted that in either of the two above described interfering positions, the cutoff valves 39 and 44 are effective only to stop and lock the piston of the lateral tilt cylinder 22 against retraction. This cylinder is positioned at substantially one side of the table top 10 while the Trendelenburg cylinder 20, about which the table top pivots during lateral tilting, is connected to substantially the opposite side of the table top 10. This provides an arrangement whereby the table top 10 can never be brought into an interfering position when the piston of lateral tilt cylinder 22 is being elevated.

Figure 4:
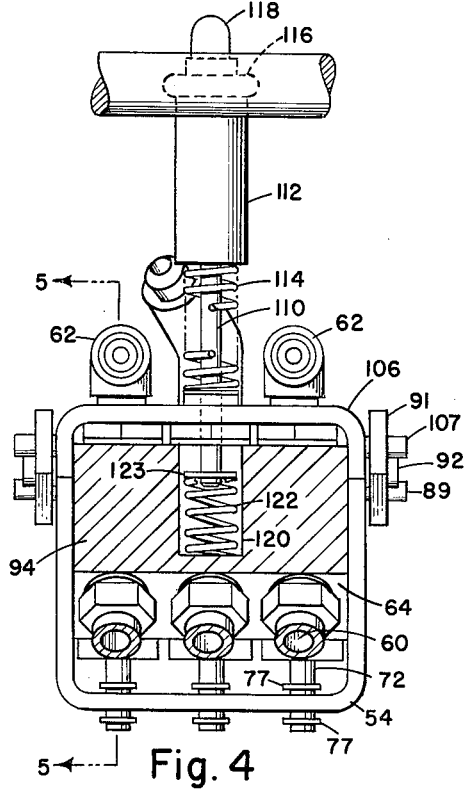
FIG. 4 is a sectional view taken substantially on the line 4—4 in FIG. 3 looking in the direction indicated by the arrows.

With reference to FIG. 4, I have shown a bank of three cutoff valves representative of the left bank of valves 38, 39 and 40 which is the same as the right bank comprising valves 42, 44 and 46. Each of these valves is provided with an inlet connection 60 and an outlet connection 62. The actuating lever 54 is U-shaped, the upper ends of legs of this lever being connected to a linkage described below.

Figure 5:
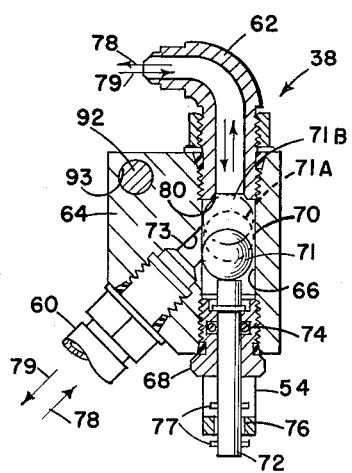
FIG. 5 is a sectional view taken substantially on the line 5—5 of FIG. 4 looking in the direction indicated by the arrows.

I shall now describe in detail the unique cutoff valve by which cylinders 12, 16, 20 and 22 are stopped and locked whenever any parts are moved into an interfering position with one or both of the sensing levers 59 and 61. Referring to FIG. 5, I have illustrated the cross-section of a cutoff valve, such as 39, which includes a valve block 64 having a vertical bore 66 threaded at either end for receiving the outlet connection 62 at the upper end and a plunger fitting 68 at the lower threaded end. That portion of the bore 66 between the lower end of the outlet connection 62 and the upper end of the plunger fitting 68 provides a chamber 70 in which a free-floating ball 71 is slidably contained. A plunger 72 is slidably mounted within the plunger fitting 68 for actuating the ball 71. The valve block 64 is provided with an angularly disposed bore 73 smaller in diameter than bore 66 and intersecting the bore 66 in the chamber 70. Intersecting bore 73 is threaded at its lower end to receive the inlet connection 60. It will be understood that inlet connection 60, outlet connection 62 and plunger fitting 68 are appropriately provided with sealing means for the prevention of fluid leakage around these parts. An O-ring seal 74 is seated in an annular groove in plunger fitting 68, thereby providing a seal between the plunger fitting 68 and the plunger 72 to prevent fluid leakage therebetween.

As viewed in FIGS. 4 and 5, the plunger actuating lever 54 has three bores 76 somewhat larger in diameter than the plungers 72. Each of the plungers has two spaced retainer rings 77, thereby providing a loose fitting connection between the plunger 72 and the plunger actuating lever 54. This permits the lever 54 to rock or pivot when actuated by the connecting linkage to be described hereinafter.

In operation, when the ball 71 is in its normal position shown in solid lines in FIG. 5 the flow of fluid in either direction indicated by the arrows 78 and 79 is unrestricted. However, when fluid flows from the inlet connection 60 through chamber 70 and is discharged through the outlet connections 62, as indicated by the arrow 78, passage of the fluid is stopped by actuating the lever 54 upwardly. The location at which the angularly disposed bore 73 intersects the chamber 70 in relationship to the length of the vertical stroke of the plunger 72 is of prime significance to my invention. This relationship is such that when the fluid flows in the direction indicated by the arrow 78 and the plunger lifts the ball 71 to the position indicated in broken lines at 72A, fluid pressure thrusts the ball 71 upwardly from the position 71A to the position 71B also shown in broken lines. Thus, the ball 71 closes an orifice or mouth 80 to the outlet connection 62, thereby stopping the flow of fluid and locking the spinal cylinder 12 against further movement.

The continued pressure of the fluid flowing in the direction of the arrow 78 maintains the ball 71 in the position 71B with a negligible amount of fluid escaping between the closure provided between the valve 71 and orifice 80. It will be understood that "pumping" of the valve will not influence the function.

So long as the part or parts of the surgical table remain in an interfering or engaging position with either one or both of the sensing levers 59 and 61, the three or four cylinders causing the interference remain locked or rather the oil on opposite sides of the piston is locked in the cylinder so as to prevent any further movement in the direction of interference. However, by reversing the flow of fluid to pass through chamber 70 in the direction indicated by the arrow 79, the ball 71 is forced downwardly to engage the plunger 72 and force the plunger back to the position shown in solid lines in FIG. 5, thereby permitting unrestricted flow of fluid. Although in ordinary circumstances, the fluid pressure in the direction indicated by the numeral 79 is sufficient to force the plunger downwardly to the position shown in solid line, it will be understood that the passage of fluid in the direction indicated by the arrow 79 will not be stopped should the plunger happen to maintain the ball 71 in the position 71A.

Thus, I have provided a novel valving arrangement, whereby the flow of fluid in the direction indicated by the arrow 78 may be stopped by actuation of a lever such as provided at 54, but the flow of fluid in the direction indicated by the arrow 79 cannot be stopped even by actuation upwardly of the lever 54.

I have shown in FIG. 6 a second embodiment of this cutoff valve. I have used corresponding numerals to designate corresponding parts followed by the suffix "c."

It will be understood that the plunger 72c is adaptable to reciprocate within an electrically controlled solenoid 82.

The plunger 72c is provided with a metal ring 84, insulated from the plunger 72c, to bridge an electrical circuit 86 by engaging two metal contact fingers 88 in circuit. The plunger 72c is actuated when the contact 90 completes the solenoid actuating circuit 86. Completion of the circuit creates an electrical impulse sufficient to drive the ball or valve 71c into the flow stream of the fluid whereby effecting closure of the orifice 80c. The solenoid 82 disconnects automatically when the circuit is broken by the ring 84 disengaging the contact fingers 88, and the plunger is returned to the solid line position after lifting the ball.

It will be understood that other electrical and mechanical arrangements could easily and conveniently be provided for actuation of the plunger 72 to lift the valve or ball 71 into the current of the fluid flowing in the direction indicated by the arrow 78.

I shall now describe the support structure and linkage interconnecting the actuating lever 54 with the sensing lever 59. With reference to FIGS. 2 and 3, the valve block 64 and a spacer 94 are connected to a vertical supporting member 96 by two through-bolts 97. This supporting member 96, in turn, is rigidly connected by bolts 98 to a lever supporting frame 99 surrounding the lateral tilt cylinder 22, Trendelenburg cylinder 20 and other parts of the surgical table not significant to this invention.

A cylindrical sheet metal appearance cover member 100 serving as a shield for purposes of appearance is supported at its upper end by bolts or screws 102 threaded into supporting frame 99. Frame 99 is rigidly connected to and supported by a main support frame or yoke 103, in turn, rigidly mounted to the top of the piston (not shown) of an elevation cylinder 104 (FIG. 1). The piston of cylinder 104 elevates the surgical table top in a manner not pertinent to this invention.

Referring to FIG. 3, the U-shaped plunger actuating lever 54 is pivotally supported, at opposite sides of valve block 64, by two connecting members 91 at pivot points 89. The two members 91 are pivotally mounted on opposite ends of a rod 92 mounted in a horizontal bore 93 (FIG. 5). Connecting members 91 are controlled by a U-shaped connecting yoke member 106 pivotally connected to member 91 at 107.

Yoke member 106 is actuated by the sensing lever 59 rigidly mounted to a hinge 108 pivotally mounted at 109 to the lever supporting frame 99. Any movement of sensing lever 59 is transmitted to member 106 through a resilient connection comprising, a shaft 110 rigidly mounted to the yoke 106 intermediate the length of member 91 (FIG. 4); a collar 112 having a shoulder at its upper end and being slidably mounted on shaft 110 (FIG. 3); a compression spring 114 being compressed between yoke member 106 and the upper shoulder of collar 112; and an eye 116, rigidly mounted on sensing lever 59 and being transversed by shaft 110, and held in an engaging position with collar 112 in opposition to spring 114 by a nut 118 threaded onto shaft 110.

When the ensing lever 59 is moved as indicated by the broken line position 59A, the eye 116 depresses the collar 112 and spring 114. The spring 114 actuates the yoke member 106 downwardly and lever 54 is actuated upwardly by the linkage above described. The shaft 110 merely serves as a guide for the eye, spring and collar.

In FIG. 3, I have shown the sensing lever in broken line at 59A and connecting member at 91A to illustrate respectively their positions when some part of the surgical table is in an interfering or engaging position with this lever.

In operation, when a movable part of the surgical table is brought to an interfering position with sensing lever 59, the actuating lever 54 is thereby lifted causing the ball 71 to be elevated into the current of the fluid flowing in the direction indicated by the arrow 78. The fluid current thrusts the ball against orifice 80 and closure results.

It will be understood that the spring 114 permits a wide range of movement of the lever 59. This particular arrangement may be necessary, as it is with the surgical table described in my heretofore mentioned copending application, to prevent damage to the linkage members above described which transmit the actuating force to the lever 54. There are some movable parts of the table which are brought into an interfering position with the sensing levers 59 and 61 when fluid is flowing through the cutoff valves in the direction indicated by the arrow 79. The moving parts of the table are constructed so that no damage will result to other parts of the table when the cutoff valves are thus not effective to stop motion; however, the sensing levers must be resiliently mounted so as not to interfere with such movements.

It will be understood that my invention is not limited by this particular arrangement but that almost any linkage effective to transmit an actuating force to the lever 54 from the sensing device will satisfy the requirements of my invention.

Referring to FIGS. 3 and 4, I have provided a bore 120 in the spacer 94 in which is mounted a compression return spring 122 engaging a retainer ring 123 rigidly secured at the lower end of the connecting shaft 110. This latter arrangement provides an auxiliary means for returning the connecting yoke 106 and in turn the actuating lever 54 to the normal position shown in solid lines in FIGS. 4 and 5. Here, again, it will be understood that any of a number of arrangements could be provided for returning the linkage to its normal position after the sensing lever 59 has been released. As pointed out above, sufficient pressure is exerted by the fluid flowing from the inlet 62 to the outlet 60 as indicated by the arrow 79 to thereby force the ball or valve 71 downwardly to the solid line position illustrated in FIG. 4. Therefore, such a spring is only auxiliary construction.

Although the shapes or contours of the sensing levers 59 and 61 are not significant to my invention, it is obvious from FIGS. 2, 3 and 4 that these sensing levers of the illustrated embodiment are of irregular shapes. The particular contour for each of these levers is designed so that the levers will be engaged by any moving parts of the surgical table before they damage any other structural portion of the table.

With reference to FIG. 2, I have shown the spinal cylinder 12 and femoral cylinders 16 respectively at 12A and 16A in broken lines to illustrate the positions in which these cylinders are brought into interfering positions respectively with sensing levers 59 and 61.

In this embodiment of my invention, even when the pistons of the spinal cylinder 12 and the femoral cylinder 16 are not in motion, certain movements of the pistons of lateral tilt cylinder 22 and the Trendelenburg cylinder 20 will bring the spinal and femoral cylinders into the interfering positions respectively indicated at 12A and 16A to bring other movable parts of the surgical table into interfering positions along the length of the sensing levers 59 and 61, thereby to actuate one or both banks of cutoff valves to stop all motion of the table top 10 and lock the table top against further motion.

In operation, when the spinal cylinder 12, the femoral cylinder 16, or other movable parts of the surgical table engage the sensing levers 59 and 61, motion is transmitted by the above described linkage respectively to the actuating levers 54 and 55, thereby causing the ball or valve 71 of the cutoff valves to be thrust upwardly and engage the orifice 80, thereby stopping flow of the fluid in the direction indicated by the arrow 78 in FIG. 5. Thus, all control cylinders are brought to a stop and locked. In order to release the ball or valve 71, in each of the cutoff valves 38, 39, 40, 42, 44 and 46, effectively stopping all motion of the table top 10, it is necesary to reverse the flow of fluid in the cylinders which have caused actuation of the sensing levers 59 and 61. Reverse flow of the fluid as indicated at 79 releases the actuating lever 54 and/or 55, thereby forcing the ball or valve 71 downward against the plunger to the solid line position shown in FIG. 5. Until further interference by one of the cylinders or other movable parts with one of the sensing levers 54 and 55, fluid can flow in either of the directions indicated by the arrows 78 or 79.

While I have described and shown the preferred form of mechanism of my invention, it will be apparent that various modifications and changes may be made therein, in addition to those specifically pointed out above, particularly in the form and the relation of parts without departing from the spirit of my invention as set forth in the appended claims.

I claim:

1. In a surgical table having a lower base and a plurality of fluid controlled apparatus including interconnected table top sections, at least a part of said fluid controlled apparatus being articulatable into interference with other parts of said table,
   (a) sensing lever means defining an interference path intermediate said table top and lower base, and
   (b) means responsive to said lever means for stopping said fluid controlled apparatus when articulated portions of the table are moved into the interference path.

2. Apparatus in accordance with claim 1 in which,
   (c) said lever means comprises a pair of levers resiliently mounted at the top of and on opposing sides of said base.

3. In a surgical table having a lower base and a plurality of fluid controlled apparatus including interconnected table top sections, at least a part of said fluid controlled apparatus being articulatable into interference with other parts of said table,
   (a) a sensing lever of a selected configuration defining an interference path intermediate said table top and lower base,
   (b) said lever being resiliently carried on said lower base, and
   (c) means responsive to said lever for stopping the flow of fluid when articulated portions of the table are moved into the interference path, thereby stopping said fluid controlled apparatus.

4. Apparatus in accordance with claim 2 in which,
   (d) said lever comprises a ring at least partially surrounding the top of said lower base and pivotally carried thereon.

5. A surgical table comprising, in combination,
   (a) a lower table base,
   (b) a table top carried by said lower base comprising a pelvic section, a spinal section articulated with respect to said pelvic section, a femoral section articulated with respect to said pelvic section,
   (c) means for articulating said table top sections and moving the table to a lateral tilt, Trendelenburg and reverse Trendelenburg positions, some of said operations of the table being capable of causing interference between parts of said table beneath the table top surface,
   (d) lever means between said lower base and table top for sensing such interference prior to its occurrence, and
   (e) means responsive to said sensing means for stopping the movement of the table top prior to actual occurrence of said interference.

References Cited in the file of this patent

UNITED STATES PATENTS

| | | |
|---|---|---|
| 1,361,904 | Rhodes | Dec. 14, 1920 |
| 1,544,751 | Haynes et al. | July 7, 1925 |
| 2,172,941 | Manning et al. | Sept. 12, 1939 |
| 2,217,783 | Bell | Oct. 15, 1940 |
| 2,245,080 | Pendleton | June 10, 1941 |
| 2,383,689 | Silver | Aug. 28, 1945 |
| 2,391,492 | Turchan et al. | Dec. 25, 1945 |
| 2,447,968 | Trotter | Aug. 24, 1948 |
| 2,520,455 | Clachko | Aug. 29, 1950 |
| 2,573,563 | Gardiner | Oct. 30, 1951 |
| 2,575,507 | Acton | Nov. 20, 1951 |
| 2,586,932 | Gardiner et al. | Feb. 26, 1952 |
| 2,618,121 | Tucker | Nov. 18, 1952 |
| 2,636,348 | Murray | Apr. 28, 1953 |
| 2,707,867 | Ruhl | May 10, 1955 |
| 2,756,724 | Stewart et al. | July 31, 1956 |
| 2,794,694 | Fullwood | June 4, 1957 |
| 2,868,174 | Shutt | Jan. 13, 1959 |
| 2,891,514 | Moeller | June 23, 1959 |